UNITED STATES PATENT OFFICE.

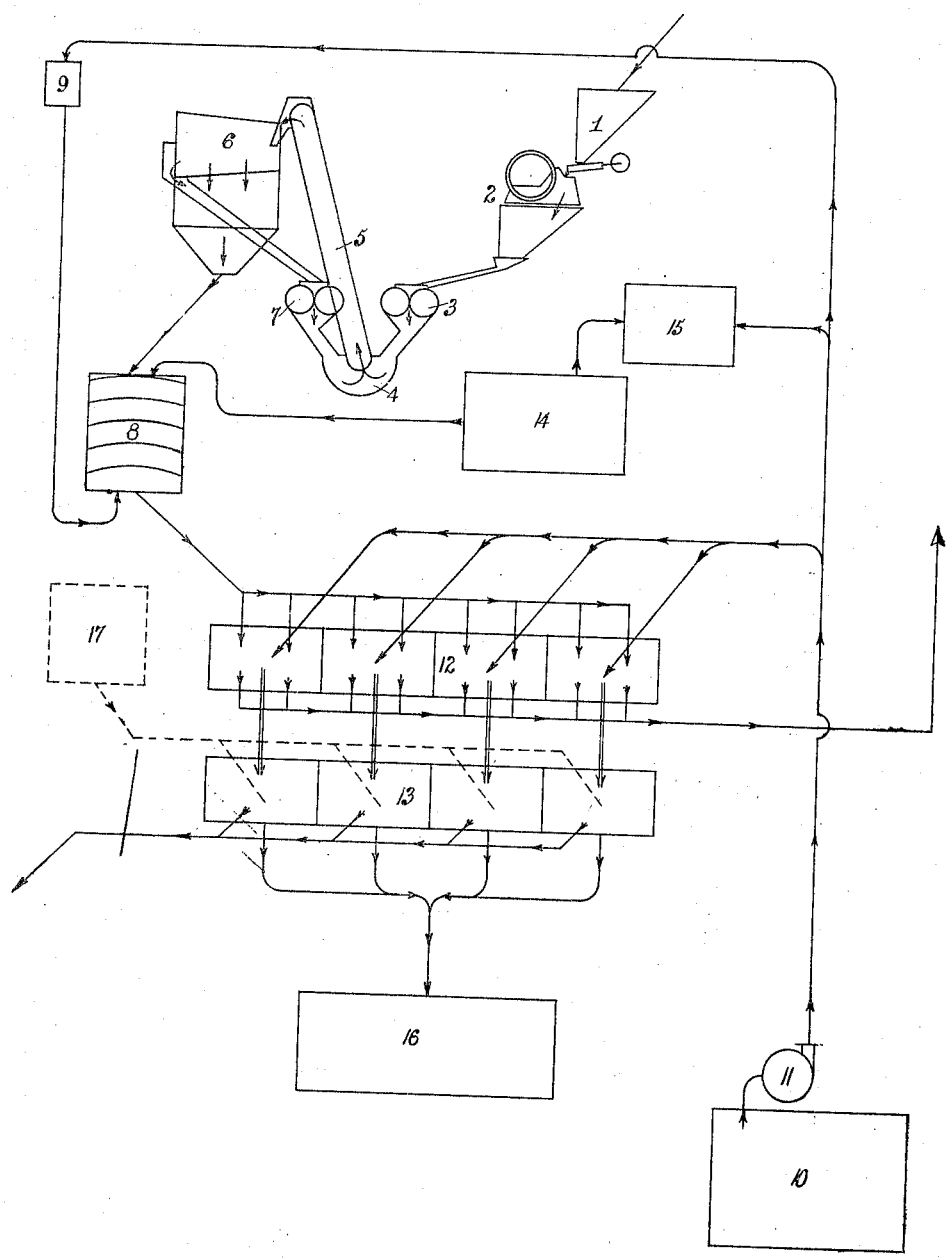

CARLOS MALSCH MALSCH AND CARLOS HENNES GILSON, OF VALPARAISO, CHILE, ASSIGNORS TO SOCIEDAD METALURJICA CHILENA CUPRUM, OF VALPARAISO, CHILE, A LIMITED LIABILITY COMPANY OF CHILE.

METALLURGICAL PROCESS.

1,303,701.	Specification of Letters Patent.	Patented May 13, 1919.

Application filed November 7, 1916. Serial No. 130,106.

*To all whom it may concern:*

Be it known that we, CARLOS MALSCH MALSCH and CARLOS HENNES GILSON, subjects of the Emperor of Germany, and residents of Valparaiso, Chile, have invented a new and Improved Metallurgical Process, of which the following is a full, clear, and exact description.

Our invention relates to the extraction of metal from ores, particularly sulfid ores.

An object thereof is to provide a simple, inexpensive and efficient method which permits the reclamation of metals from poor ores.

Another object of the invention is to provide a process in which the ore, in the process of oxidation, is converted into soluble salts which can be easily precipitated from the solvent.

We attain this and other objects of the invention by the structure disclosed diagrammatically in the accompanying drawing.

The method may be divided into three parts.

First, roasting the sulfureted ores or metallic sulfids of any origin in the presence of water and an oxidizing agent adapted to oxidize the sulfur dioxid, which, with the water or moisture present, forms sulfuric acid reacting with the oxid of the metal formed by roasting to form a soluble salt of said metal.

Second, the lixiviation or leaching of ores or sulfids roasted to obtain a solution of the sulfate formed and other soluble compounds originated in the roasting.

Third, the precipitation of the sulfates formed by means of iron sulfid.

It is of prime importance that the roasting of the ores be thorough and that the oxidizing agent be introduced into the zone of the roasting furnace wherein the roasting is already somewhat advanced, and that the oxidizing agent be in solution in water and, therefore, the introduction of both vapors and oxidizing agent be made simultaneously and, consequently, easier to control. It is also of great importance that the ore roasted should remain a sufficient length of time in contact with the vapors and the oxidizing agent, and that the gas originating in the heating of the vapors and oxidizing agent and that originated by the roasting of the ore should travel in the furnace in the same direction.

The ore to be treated is preferably a sulfid ore. It is delivered to a hopper 1 from which it is distributed to the crusher 2 to be broken up. From the hopper the broken-up ore is delivered to a coarse mill 3 which discharges into a trough 4 from where a conveyer 5 delivers the ore to the classifier 6. The overflow from the classifier is directed to a finer mill 7 which discharges again into the trough 4 to be returned to the classifier. From the classifier the ore is delivered to the furnace or furnaces 8. To the same furnace an oxidizing agent is delivered from a tank 9, the oxidizing agent in the tank carrying moisture.

The oxidizing agent we prefer to use is a nitrogen compound, preferably a nitrate; consequently the formation of the sulfuric acid in the furnace is similar to the lead-chamber process. The nitrous compounds being the catalytic agents their consumption, or better, that of the nitrate producing them, will be really small. Due to the fact that the sulfuric acid is formed *in situ*, the conversion of the metal of the ores is more complete than that obtained by any other process. The sulfurizing is also favored by the sulfates which are formed in the decomposition of the nitrate. It will be also understood that the roasting serves to transform the ores or metallic oxids into sulfates when sulfids or sulfur are added in suitable quantities.

Water is supplied to the tank 9 from the reservoir 10 by a pump 11. This pump also supplies water to the lixiviation tanks 12 and precipitation tanks 13. 14 is the fuel storage and 15 is the power plant. 16 is the drying plant into which the precipitate is discharged from the precipitation tanks 13. 17 is the tank for the storage of iron scrap from which sulfid of iron is made.

After being treated as described the ore is lixiviated to dissolve the sulfates of metals. The metals are precipitated by means of iron sulfid, for the reason that this compound is more economical than sulfureted hydrogen or any other sulfid soluble in water.

The iron sulfid, partially prepared from a solution of any iron salt by means of sodium sulfid, is an excellent precipitant for copper and silver sulfates, even when their solution is neutral. It also precipitates zinc out of solutions of zinc sulfid, but not as rapidly and completely as in the former cases. It is also more advantageous than iron because the latter is easily converted into soluble salts serving only for the precipitation, while the iron sulfid can be regenerated. This can be easily seen from the reaction realized in the precipitation of the sulfates by the iron sulfid, and from the reactions showing the preparation of the iron sulfid by means of the sodium sulfids. For instance, a solution of copper sulfate if treated with a ferrous sulfid results in a copper sulfid and an iron sulfate, $$CuSO_4 + FeS = CuS + FeSO_4.$$

The copper sulfid is precipitated, the iron sulfate remaining in solution, and, therefore, can be separated by filtration. By adding sodium sulfid to the solution of iron sulfate an iron sulfid results as a precipitate with a soluble sodium sulfate in solution, again separable by filtration.

$$FeSO_4 + Na_2S = FeS + Na_2SO_4.$$

The sodium sulfate can then be reduced to sodium sulfid with carbon.

$$Na_2SO_4 + 2C = Na_2S + 2CO_2.$$

From the above it will be seen that the quantity of sodium sulfid necessary for the regeneration of the iron sulfid is comparatively little, in view of the fact that it is only necessary to add at suitable intervals a small quantity of sodium sulfid for the deterioration of that becoming contaminated by impurities during the reactions and losses unavoidable in the reaction. The sodium sulfid can be easily obtained by the reduction of a sodium sulfate with carbon, the sodium sulfate being cheap and easily obtainable. It is self-evident that the iron sulfid may be obtained in any other suitable way and used for precipitation of the metals to be extracted from the ore.

It is evident that the nitrous compounds which are found in the gases coming from the ores in the furnace can be regenerated in the well known way and used over again in the manufacture of sulfuric acid. The most important part of our metallurgical process is the introduction into the roasting furnace of a nitrate in solution to react with the roasted ore to produce a sulfate which can be easily leached. The other important point of the method is the precipitation of the metal from the solution by iron sulfid.

We claim:

1. A metallurgical process which consists in roasting sulfid ores, introducing nitrates in solution into the roasting zone wherein the roasting of the ore is somewhat advanced to form sulfates of the metals present in the ore, leaching the sulfates formed, and precipitating said leached metals from the solution.

2. A metallurgical process which consists in roasting sulfid ores to form sulfur dioxid, introducing moisture and an oxidizing agent into the roasting zone, wherein the roasting of the ore is somewhat advanced, to transform the sulfur dioxid into sulfuric acid to cause the same to react with the roasted ore to form sulfates, leaching the resulting sulfates, and precipitating the leached metals from the solution.

3. A metallurgical process which consists in roasting sulfid ores to form sulfur dioxid, introducing moisture and nitrous oxidizing compounds into the roasting zone where the roasting of the ore is somewhat advanced to transform the sulfur dioxid into sulfuric acid which will react with the roasted ore to form sulfates, leaching the resulting sulfates, and precipitating the leached metals from the solution.

4. A metallurgical process which consists in roasting sulfid ores to form sulfur dioxid, introducing moisture containing an oxidizing agent in solution into the roasting zone, wherein the roasting of the ore is somewhat advanced, to transform the sulfur dioxid into sulfuric acid which will react with the roasted ore to form sulfates, leaching the resulting sulfates, and precipitating the leached metals from the solution.

CARLOS MALSCH MALSCH.
CARLOS HENNES GILSON.